(12) United States Patent
Pietromonaco

(10) Patent No.: US 9,780,704 B2
(45) Date of Patent: Oct. 3, 2017

(54) ELECTRICAL MOTOR SYSTEM AND METHOD OF OPERATING THE ELECTRICAL MOTOR SYSTEM

(71) Applicant: ARM Limited, Cambridge (GB)

(72) Inventor: David Pietromonaco, San Jose, CA (US)

(73) Assignee: ARM Limited, Cambridge (GB)

(*) Notice: Subject to any disclaimer, the term of this patent is extended or adjusted under 35 U.S.C. 154(b) by 0 days.

(21) Appl. No.: 14/488,679

(22) Filed: Sep. 17, 2014

(65) Prior Publication Data

US 2016/0079893 A1    Mar. 17, 2016

(51) Int. Cl.
*H02P 25/092* (2016.01)
*H02P 6/14* (2016.01)
(Continued)

(52) U.S. Cl.
CPC ............ *H02P 6/14* (2013.01); *H02K 11/22* (2016.01); *H02K 19/103* (2013.01);
(Continued)

(58) Field of Classification Search
CPC .............................. H02P 6/18; Y10S 388/923
See application file for complete search history.

(56) References Cited

U.S. PATENT DOCUMENTS 3,697,839 A    10/1972    Unnewehr
5,272,401 A *  12/1993    Lin .................. H02K 37/18
                                              310/49.37

(Continued)

FOREIGN PATENT DOCUMENTS

EP    0 441 970    8/1991
EP    1 039 625    5/2002
(Continued)

OTHER PUBLICATIONS

New Converter Configurations for Switched Reluctance Motors Wherein Some Windings Operate on Recovered Energy Vijay V. Deshpande, Member, IEEE, and Jun Young Lim; IEEE Transactions on Industry Applications, vol. 38, No. 6, Nov./Dec. 2002.*

(Continued)

*Primary Examiner* — Shawki S Ismail
*Assistant Examiner* — Muhammad S Islam
(74) *Attorney, Agent, or Firm* — Nixon & Vanderhye P.C.

(57) ABSTRACT

An electrical motor system comprises a switched reluctance electrical motor comprising a rotor section and a stator section, the rotor section comprising a plurality of rotor teeth and the stator section comprising a plurality of stator teeth, the stator teeth wound with respective coils. Coil driver circuitry is coupled to the coils of the stator teeth and controls an independent phase of electrical power to each coil of the plurality of stator teeth. The coils of the stator teeth each have an inductance which absorbs electrical energy provided to that coil by the coil driver circuitry and subsequently releases at least a portion of the electrical energy back to the coil driver circuitry when that coil is not being actively driven by the coil driver circuitry. The coil driver circuitry comprises an electrical energy store configured to store the portion of the electrical energy released back from the inductance of each coil and the electrical energy provided to each coil of the stator teeth by the coil driver circuitry is augmented by the electrical energy stored in the electrical energy store.

23 Claims, 16 Drawing Sheets

(51) Int. Cl.
*H02K 19/10* (2006.01)
*H02K 11/22* (2016.01)
*H02K 3/18* (2006.01)
*H02K 16/00* (2006.01)

(52) U.S. Cl.
CPC .............. *H02P 25/092* (2016.02); *H02K 3/18* (2013.01); *H02K 16/00* (2013.01); *H02K 2213/03* (2013.01); *H02K 2213/12* (2013.01)

(56) References Cited

U.S. PATENT DOCUMENTS

| | | | |
|---|---|---|---|
| 5,633,568 A | 5/1997 | Dunfield | |
| 5,889,922 A | 3/1999 | Bufe | |
| 5,923,142 A | 7/1999 | Li | |
| 6,078,161 A * | 6/2000 | Kim | H02P 25/098 318/254.2 |
| 6,137,256 A * | 10/2000 | Morris | H02P 25/092 318/254.2 |
| 6,339,310 B1 * | 1/2002 | Sugiyama | B60L 3/0023 318/473 |
| 2004/0085040 A1 | 5/2004 | Chen | |
| 2005/0072608 A1 * | 4/2005 | Johnston | B60K 6/46 180/65.245 |
| 2005/0116679 A1 * | 6/2005 | Ramu | H02M 3/1582 318/700 |
| 2007/0031131 A1 * | 2/2007 | Griffitts | H02P 6/18 388/811 |
| 2009/0146598 A1 * | 6/2009 | Hayashi | H02P 6/18 318/400.34 |
| 2010/0123426 A1 * | 5/2010 | Nashiki | H02K 1/12 318/701 |
| 2011/0181135 A1 * | 7/2011 | Pollock | H02K 19/103 310/49.46 |
| 2013/0076292 A1 | 3/2013 | Okada et al. | |
| 2013/0257188 A1 * | 10/2013 | Raminosoa | H02K 19/103 310/46 |
| 2014/0139154 A1 * | 5/2014 | Chuang | H02K 19/103 318/400.02 |

FOREIGN PATENT DOCUMENTS

| | | |
|---|---|---|
| EP | 2 372 894 | 10/2011 |
| WO | WO 2013/105506 | 7/2013 |

OTHER PUBLICATIONS

New Converter Configurations for Switche Reluctance Motors Wherein Some Winding, Operate on Recovered Energy, Vijay V. Deshpande, Member, IEEE, and Jun Young Lim; IEEE Transactions on Industry Applications, vol. 38, No. 6, Nov./Dec. 2002.*
Notice of Allowance dated Apr. 15, 2016 in co-pending U.S. Appl. No. 14/488,666, 11 pages.
International Search Report and Written Opinion of the International Searching Authority dated Jan. 15, 2016 in PCT/GB2015/052590, 14 pages.
Office Action dated Dec. 15, 2015 in co-pending U.S. Appl. No. 14/488,666, 7 pages.
International Search Report and Written Opinion of the International Searching Authority dated Nov. 18, 2015 in PCT/GB2015/052589, 11 pages.
U.S. Appl. No. 14/488,666, filed Sep. 17, 2014, Pietromonaco.
Office Action dated Aug. 3, 2017 in co-pending U.S. Appl. No. 15/209,790, 7 pages.

* cited by examiner

OFFICIAL SENSOR OUTPUT:

| 1 | 2 | 3 |
|---|---|---|
| ON | OFF | OFF |
| ON | ON | OFF |
| OFF | ON | OFF |
| OFF | ON | ON |
| OFF | OFF | ON |
| ON | OFF | ON |

# ELECTRICAL MOTOR SYSTEM AND METHOD OF OPERATING THE ELECTRICAL MOTOR SYSTEM

TECHNICAL FIELD

The present disclosure relates to an electrical motor system. More particularly, this disclosure relates to an electrical motor system comprising a switched reluctance electrical motor.

DESCRIPTION OF THE PRIOR ART

In an electrical motor which has coil windings as part of its stator, such as in a switched reluctance electrical motor, it is common for the electrical motor to be powered by a three phase power supply and to apply AC waveforms to the coil windings to control the operation of the motor. Some electric motors have been created with more phases, but a significant factor in creating such multi-phase electrical motors is the cost of the phase driver electronics. In conventional motors a pulse width modulation (PWM) voltage controller (typically arranged with an H-bridge topology to drive motor coils bi-directionally) is coupled to a large power supply and the large voltages and currents which are required to drive the motor coils can add significantly to the cost of the driver circuitry. Accordingly, multiple phase motors requiring multiple coil driver circuits are expensive to produce according to contemporary techniques.

Also conventional motors usually only operate at their highest efficiency when operating at full design output power levels. It is known to provide variable output driver circuits to allow a motor to operate at reduced output power levels, but the motor efficiency is then markedly reduced due to a less effective coupling of the smaller magnetic fields. Consequently, to maintain reasonable efficiency such motors must be operated in narrow ranges near their design points, and mechanical gearboxes and transmission systems (even some with multiple motors) must be used to maintain efficiency across a wider range of output levels. Such configurations are both expensive and mechanically complex.

SUMMARY

Viewed from a first aspect, the present techniques provide an electrical motor system comprising: a switched reluctance electrical motor comprising a rotor section and a stator section, the rotor section comprising a plurality of rotor teeth and the stator section comprising a plurality of stator teeth, the stator teeth wound with respective coils, and coil driver circuitry coupled to the coils of the stator teeth to independently control a phase of electrical power to each coil of the plurality of stator teeth, wherein the coils of the stator teeth each have an inductance which absorbs electrical energy provided to that coil by the coil driver circuitry and subsequently releases at least a portion of the electrical energy back to the coil driver circuitry when that coil is not being actively driven by the coil driver circuitry, and wherein the coil driver circuitry comprises an electrical energy store to store the portion of the electrical energy released back from the inductance of each coil and the electrical energy provided to each coil of the stator teeth by the coil driver circuitry is augmented by the electrical energy stored in the electrical energy store.

The coil driver circuitry is arranged to independently control a phase of electrical power to each coil of the plurality of stator teeth. As such, each of the respective coils of the stator teeth can be independently controlled by the coil driver circuitry. That is to say, each stator tooth coil is provided with its own phase of electrical power. These phases may in principle be unique (i.e. differ for each stator tooth coil) or may be repeated amongst the stator coils as the particular configuration requires.

Previously, such an electrical motor system would have been impractical and prohibitively expensive. This is due to the fact that independent control of the respective coils of the plurality of stator teeth would require a complexity (and hence cost) of the coil driver circuitry which would render the electrical motor system uneconomic. However, one aspect of the present techniques advantageously provides coil driver circuitry which is associated with the stator teeth coils in such a way to take advantage of the inductance of each of stator teeth, so that electrical energy provided to each coil by the coil driver circuitry is at least in part recycled, by being subsequently released from the coil back to the coil driver circuitry (and stored in its electrical energy store) so that the provision of further electrical energy to the coil is subsequently augmented by the electrical energy stored in the electrical energy store. The electrical energy store may for example be a storage capacitor.

This means that the electrical power drawn by the coil driver circuitry in order to power the stator teeth coils is used significantly more efficient than in prior art systems, and it has been found that in fact a significant proportion of the electrical energy required to run the electrical motor system can be recycled in this manner. The resulting efficiency makes it practical to provide an electrical motor system with independent control over each coil of the plurality of stator teeth.

In some embodiments the coil driver circuitry may comprise a plurality of independently powerable coil drivers, each coil driver coupled to the coils of a subset of the plurality of stator teeth. The independently powerable coil drivers may for example be a plurality of independently powered coil driver boards, each coil driver board comprising one or more instance of the coil driver circuitry and connected to the coil of a subset of the plurality of stator teeth. The association of a set of stator teeth coils to each coil driver (e.g. board) facilitates the recycling of electrical energy in the system, in particular when more than one stator coil is concurrently powered but with an opposite polarity. This means that when one coil is pulling current from the driver's power supply, the other coil is providing it back, and the net effect is that the energy from the providing channel (i.e. the circuitry driving one coil of the pair) goes directly into the pulling channel (i.e. the circuitry powering the other coil of the pair) without tapping the driver's supply for more energy than is necessary to recover (at least in the majority) the small losses on the cycle, especially when the motor output shaft power requirements are low. In some embodiments each coil driver is coupled to the coils of at least 6 stator teeth.

In some embodiments the plurality of rotor teeth and the plurality of stator teeth are in a two:three ratio.

In some embodiments the stator section comprises at least 12 stator teeth. The stator section may for example have exactly 12 teeth. In this example configuration, and in embodiments in which the ratio of the number of rotor teeth to stator teeth is two:three, there are then 8 rotor teeth. The two:three ratio of rotor teeth to stator teeth provides a particular symmetry to the configuration of the electrical motor, which enables benefit with respect to the control of the electrical motor to result.

In some embodiments the stator section of the electrical motor has at least 24 stator teeth and may for example have exactly 24 teeth. In this further example configuration, and in embodiments in which the ratio of the number of rotor teeth to stator teeth is two:three, there are then 16 rotor teeth.

In some embodiments, in which the stator section comprises at least 12 stator teeth, the at least 12 stator teeth may be grouped into sets of six stator teeth, wherein the coils of a set of six stator teeth are configured to be driven such that when a first coil of the set is provided with electrical energy, a second and third coil of the set are not substantially provided with electrical energy, a fourth coil of the set is provided with electrical energy, and a fifth and sixth coil of the set are not substantially provided with electrical energy, wherein the first to sixth coils of the set are arranged in adjacent, numerically increasing order, and the switched reluctance electrical motor is configured so that the magnetic fields developed in the first and fourth coil of the set are of opposite polarity. The configuration in which the rotor teeth and stator teeth are in, for example a two:three ratio, means that in a set of six adjacent stator teeth, there may be two stator teeth (in some embodiments it may be exactly two stator teeth) which are aligned with rotor teeth and, as the rotor rotates within the stator, the two stator teeth which are aligned with rotor teeth with sequentially change through that set of six stator teeth. Accordingly, powering the coils of the set of six stator teeth in pairs provides an efficient drive mechanism. Moreover in this configuration in which two coils of the set are powered such that their resulting individual magnetic fields are of opposite polarity, the resulting conjoined magnetic field actively enhances the magnetic field strength in the "active" (energised) teeth and pulls the field away from the "off" teeth, reducing drag on the motor and increasing efficiency.

In some embodiments, the coils of the set of six stator teeth may be configured to be driven in a repeating sequence in which: firstly the first and fourth coils of the set are provided with electrical energy and the second, third, fifth and sixth coils of the set are not substantially provided with electrical energy; secondly the second and fifth coils of the set are provided with electrical energy and the first, third, fourth and sixth coils of the set are not substantially provided with electrical energy; and thirdly the third and sixth coils of the set are provided with electrical energy and the first, second, fourth and fifth coils of the set are not substantially provided with electrical energy. This repeating sequence of pairs of coils of the set being provided with electric energy enables flexible control over the motor to be exercised, in which the direction of rotation of the motor can be determined by the polarity of the electrical energy asserted.

The opposite polarity of the electrical energy provided to each coil of the pairs of coils that are powered at the same time may be achieved in number of ways. In some embodiments, the coil driver circuitry may be configured to bring about the opposite polarity of the electrical energy provided to the fourth coil of the set by actively driving the fourth coil of the set with the opposite polarity with which it actively drives the first coil of the set. In this manner, the first and fourth coil of the set can have substantially the same configuration as one another, in particular being wound in the same direction, and furthermore have a direct connection to the coil driver circuitry, and it is the coil driver circuitry which determines the polarity of the electrical energy which is provided to the respective coils.

In some embodiments, the fourth coil of the set may be wound in an opposite sense to the first coil of the set to bring about the opposite plurality of the electrical energy provided to the fourth coil of the set. In this manner, the coil driver circuitry can be configured to provide electrical energy of the same polarity to the first coil of the set and fourth coil of the set, but the winding direction of the fourth coil with respect to the first coil results in the magnetic field induced by powering the first coil being in the opposite direction to the magnetic field induced by the fourth coil.

In some embodiments, the switched reluctance electrical motor may further comprise a switching arrangement configured to bring about the opposite polarity of the electrical energy provided to the fourth coil of the set. This also provides a mechanism by means of which the coil driver circuitry providing the electrical energy can provide electrical energy of a single polarity, but the switching arrangement can bring about the opposite plurality of the electrical energy provided to the fourth coil.

In some embodiments the switched reluctance electrical motor may further comprise three optical sensors positioned relative to three stator teeth of a set of six stator teeth to detect positions of rotor teeth. These three optical sensors take advantage of the fact that, given the two:three ratio of the number of rotor teeth to stator teeth, three stator teeth (for example, three adjacent stator teeth) of the set of six stator teeth can be selected such that only one rotor tooth is aligned with any of the three stator teeth at any given time. This thus enables the position of the rotor with respect of the stator to be determined with only three optical sensors and a relatively cheap position sensor arrangement is thus provided.

In some embodiments, the three optical sensors may be arranged such that there is always an output from either one or two of the three optical sensors indicating at least partial alignment of either one or two rotor teeth with the one or two optical sensors, and such that there is never output from all three of the optical sensors indicating at least partial alignment of three rotor teeth with the three optical sensors. Accordingly, sizing the optical sensors relative to the rotor teeth and configuring their sensitivity such that these constraints on their output are fulfilled means that based on just a 3-bit output (i.e. the output from the three optical sensors) the position of the rotor with respect to the stator can be determined to a high degree of accuracy. For example in a configuration having 24 stator teeth, the position can be determined to within 2½ degrees. Hence with this arrangement of merely three optical sensors accurate rotational position information can be determined.

In some embodiments, the rotor teeth may be arranged such that when a first rotor tooth is closest to a stator tooth wound with the first coil of the set, further rotor teeth in positions adjacent-plus-one to the first rotor tooth provide the predominant return path for a magnetic field induced in the first rotor tooth. Thus the predominant return path for the magnetic field is relatively short—being via those further rotor teeth in adjacent-plus-one positions, and not for example further round the rotor. This enhances the magnetic field density in those regions where it is actively required to power the motor.

In some embodiments, the rotor teeth and the stator teeth may be arranged with respect to one another in a configuration in which, for any given relative orientation of the rotor section and the stator section, two of the set of six stator teeth may be substantially aligned (in other embodiments, a maximum of two) with corresponding rotor teeth, and wherein when the maximum of two of the set of six stator teeth are substantially aligned with corresponding rotor teeth no other stator teeth of the set of six stator teeth have at least partial alignment with corresponding rotor teeth. This configuration means that for the teeth which are aligned a configuration results in which there may be only a relatively small air gap between the rotor tooth and the stator tooth, corresponding to a low reluctance and hence no output power (zero torque) from the motor. Conversely the non-alignment of the other stator teeth of the set of six stator teeth with corresponding rotor teeth can thus provide a high reluctance and high torque configuration (due to the air gap between the non-aligned stator/rotor teeth). It will be appreciated that in some switched reluctance electric motors partial overlap between the rotor and stator teeth may be required in order to keep the motor in a configuration where torque can be achieved for an acceptable efficiency. However, the present electrical motor system achieves an improved trade-off between torque and efficiency by providing a configuration in which higher torque can be generated (by the non-aligned stator/rotor teeth), but also in which energy that is expended in generating a magnetic field which doesn't get used gets recycled, thus improving the efficiency.

In some embodiments, the coil driver circuitry may be configured selectively to disable electrical energy supply to at least one selected set of six stator teeth coils. Accordingly, the sets of six stator teeth coils can be switched on and off individually and this enables the motor to operate in a lower power mode. In some embodiments, the coil driver circuitry is configured selectively to disable electrical energy supply to pairs of selected sets of six stator teeth coils. This also enables the motor to operate in a lower power mode.

In some embodiments, the coil of each stator tooth may be wound with at least 100 turns. In some embodiments, the coil of each stator tooth may be wound with at least 200 turns. This high number of winding turns enables a relatively high magnetic field to be generated from a relatively low current. The lower current required by the coil driver for each coil may be achieved by using a small diameter coil wire with many (e.g. at least 100) turns. As a consequence the coil inductance provided is notably high (by comparison with a configuration in which the coil is wound with just a few turns of larger diameter wire), since coil inductance goes up with the square of the number of turn windings, and the magnetic field generated is proportional to the number of turns times the current. Hence for the same magnetic field a 4× reduction in current corresponds to a 16× increase in inductance. A high inductance of the stator teeth coils in the motor system means that they are particularly well adapted to store energy. In some embodiments, a current supplied to the coil of each stator tooth is less than 10 A. This may for example be achieved by the high number of turns of small diameter wire, meaning that a relatively low current can be used.

In some embodiments the switched reluctance electrical motor comprises two stator sections, wherein the two stator sections are arranged adjacent to one another along a longitudinal axis of the switched reluctance electrical motor.

Viewed from a second aspect the present techniques provide a method of operating an electrical motor system which comprises a switched reluctance electrical motor comprising a rotor section and a stator section, the rotor section comprising a plurality of rotor teeth and the stator section comprising a plurality of stator teeth, each stator tooth wound with a respective coil, the method comprising the steps of: controlling an independent phase of electrical power to each coil of the plurality of stator teeth; absorbing, in an inductance of each of the coils of the stator teeth, electrical energy provided to that coil; releasing, from the inductance of each of the coils of the stator teeth, at least a portion of the electrical energy when that coil is not being actively driven; storing the portion of the electrical energy released back from the inductance of each coil; and augmenting the electrical energy provided to each coil of the stator teeth by the electrical energy stored.

Viewed from a third aspect the present techniques provide an electrical motor system comprising: a switched reluctance electrical motor comprising a rotor section and a stator section, the rotor section comprising a plurality of rotor teeth and the stator section comprising a plurality of stator teeth, each stator tooth wound with a respective coil; means for controlling an independent phase of electrical power to each coil of the plurality of stator teeth; means for absorbing, in an inductance of each of the coils of the stator teeth, electrical energy provided to that coil; means for releasing, from the inductance of each of the coils of the stator teeth, at least a portion of the electrical energy when that coil is not being actively driven; means for storing the portion of the electrical energy released back from the inductance of each coil; and means for augmenting the electrical energy provided to each coil of the stator teeth by the electrical energy stored.

Viewed from a fourth aspect the present techniques provide an automobile wheel assembly in which a component of the wheel assembly is adapted to form the rotor section of the switched reluctance electrical motor in the electrical motor system of the first aspect.

In some embodiments the component of the wheel assembly is at least one of: a brake disk, a brake drum and a wheel rim.

Viewed from a fifth aspect the present techniques provide an electrical motor system comprising: a switched reluctance electrical motor comprising a rotor section and a stator section, the rotor section comprising a plurality of rotor teeth and the stator section comprising a plurality of stator teeth wound with a respective coil; and coil driver circuitry coupled to the coils of the stator teeth to control a phase of electrical power provided to each coil, wherein the coil driver circuitry comprises an electrical energy store to store a portion of the electrical energy released back from an inductance of each coil and wherein the coil driver circuitry is arranged to augment the phase of electrical energy provided to each coil with energy from the electrical power store.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
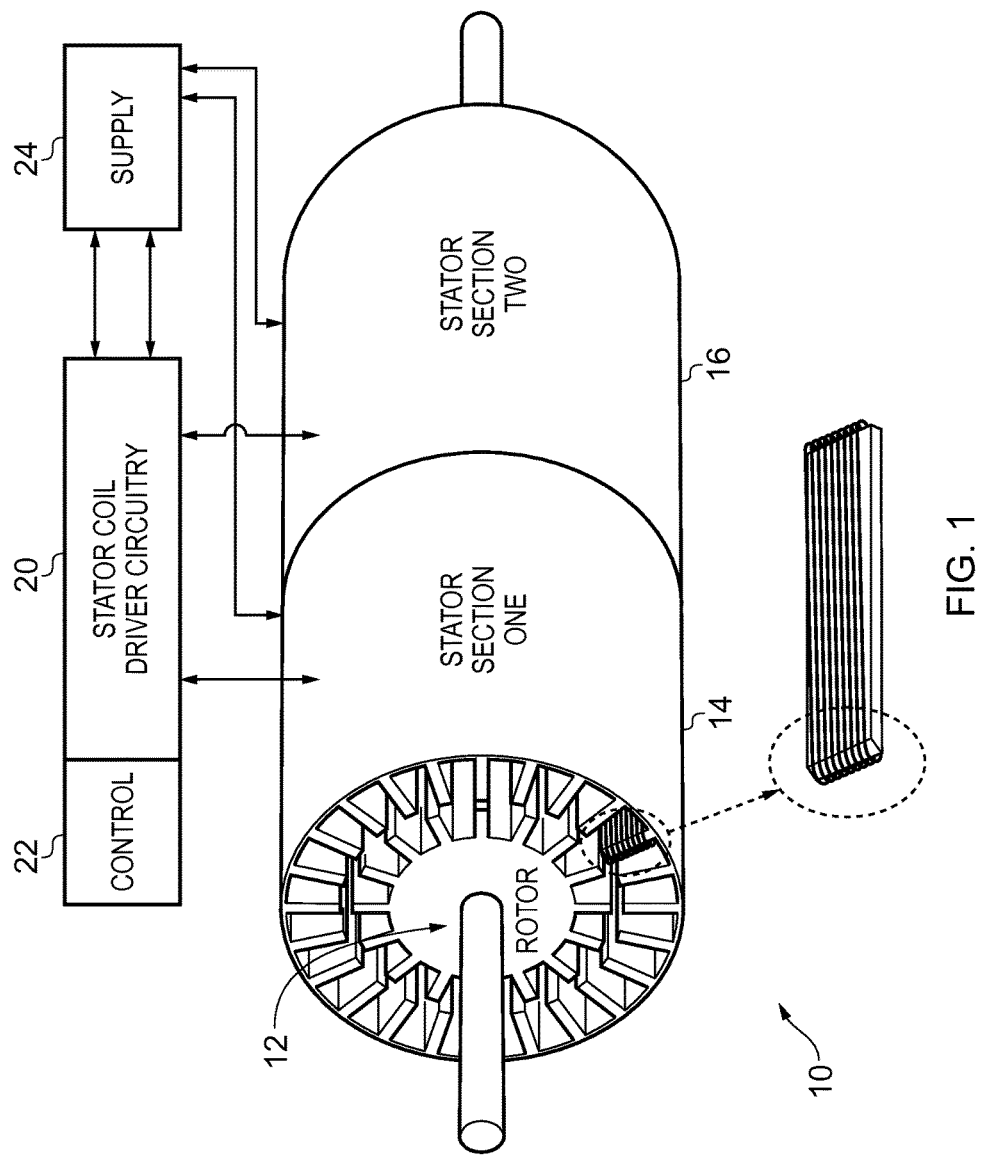
FIG. 1 schematically illustrates a switched reluctance motor having two stator sections in one example embodiment.

FIG. 1 schematically illustrates a switched reluctance electrical motor system 10 in one embodiment. The electrical motor comprises a rotor section 12 configured to rotate within two stator sections 14 and 16. The rotor section is configured to have sixteen rotor teeth, which form longitudinal spines extending radially outward and running along the length of the rotor section through both stator sections 14 and 16. Each stator section is configured to have twenty four stator teeth, which form longitudinal spines extending inwardly and also running along the length of each stator section. Each stator tooth is wound with a coil comprising a high number of turns—in this instance there being approximately two hundred. In the embodiment illustrated in FIG. 1 there are no coils on the rotor teeth, as the magnetic fields generated by powering the stator teeth coils cause the motor to rotate by the action of those magnetic fields on the rotor.

The electrical motor system 10 further comprises stator coil driver circuitry 20, which is configured to be controlled by the associated control circuitry 22. A power supply 24 is coupled to both the stator coil driver circuitry and to the stator coils of the motor. As such there can be current flow both between the stator coils and the supply 24 and between the stator coils and the stator coil driver circuitry 20. The significance of this arrangement will become apparent from the description of the further figures.

Figure 2:
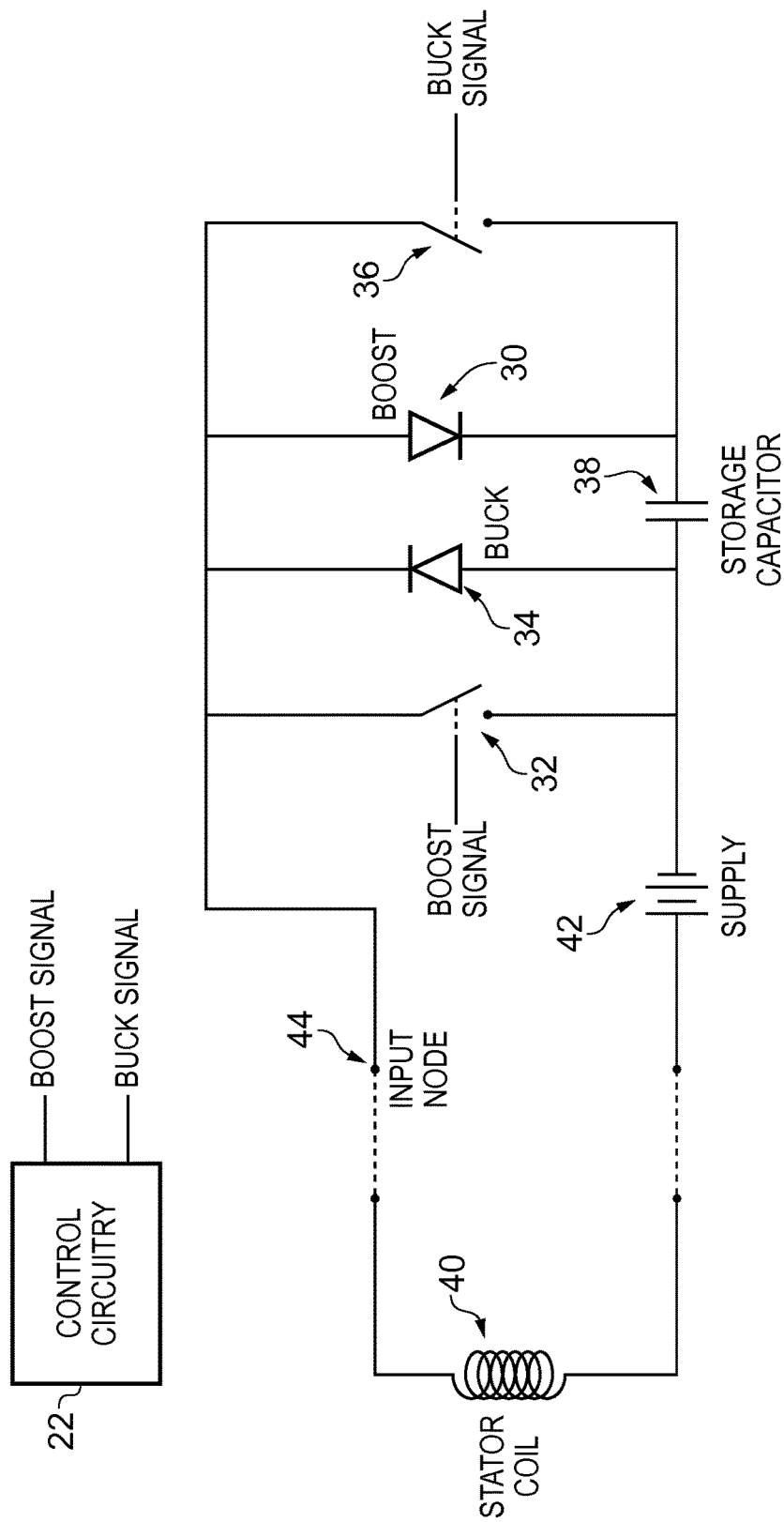
FIG. 2 schematically illustrates a coil driver circuit in one example embodiment.

FIG. 2 schematically illustrates the principle components of the stator coil driver circuitry associated with a single stator coil. In essence the circuitry shown in FIG. 2 is a combination of switched inductance boost voltage converter circuitry and switched inductance buck voltage converter circuitry. The switched inductance boost voltage converter circuitry comprises the boost diode 30 and the boost switch 32 and the switched inductance buck voltage converter circuitry comprises the buck diode 34 and the buck switch 36. The switched inductance boost voltage converter circuitry and the switched inductance boost voltage converter circuitry share the storage capacitor 38. Each is also connected, via the input node 44, to the stator coil 40 which is driven by this circuit and the supply 42. The control signals for the boost switch 32 and the buck switch 36, namely the boost signal and the buck signal respectively, are generated by the control circuitry (which here is represented by the same control circuitry 22 as shown in FIG. 1).

In operation the boost and buck signals of the example embodiment of FIG. 2 are asserted in mutual exclusion by the control circuitry 22 to cause the stator coil 40 to be powered, and moreover to be driven bi-directionally, wherein current is first caused to flow one way through the stator coil (during "boost" operation) and then to flow the other way through the stator coil (during "buck" operation). Asserting the boost signal to cause the boost switch 32 to close (conduct) causes the supply voltage provided by the supply 42 to be applied to the stator coil 40. The boost signal is asserted for a suitable period until the current flow in the stator coil is generating the required magnetic field for operation of the motor. When the boost signal is switched off, opening the boost switch 32, the current continues to flow (via the boost diode 30) as the energy is dissipated from the coil. This energy dissipated from the stator coil 40 is collected by charging the storage capacitor 38. This quickly boosts the storage capacitor to a static voltage which shuts down the current in the coil.

This "boosted voltage" stored in the storage capacitor 38 is then available for energising the stator coil 40 in the opposite direction. When this is required the buck signal is asserted to cause the buck switch 36 to close (conduct) and the previously boosted voltage can be applied (via buck diode 34) to the stator coil 40 in the opposite direction to that of the boost phase.

Figure 3:
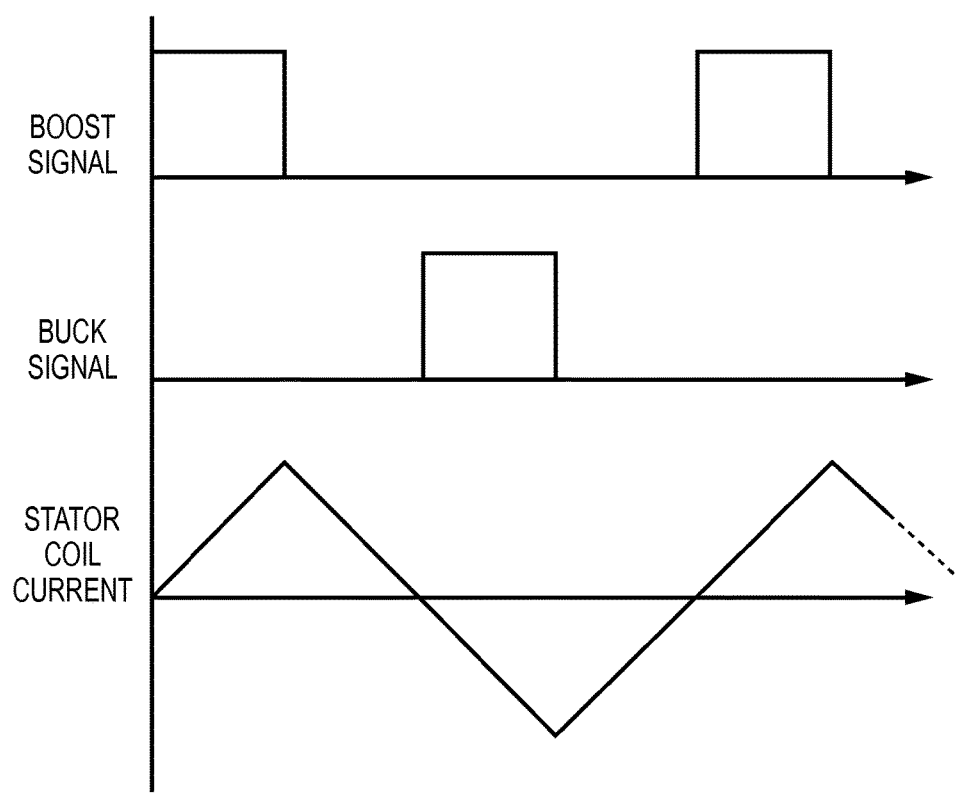
FIG. 3 shows the use of a boost signal and a buck signal in the circuit of FIG. 2 to cause variation in a stator coil current.

FIG. 3 illustrates the cyclical operation of the circuit shown in FIG. 2, in which the stator coil current is caused first to be driven in one (e.g. positive) direction by the assertion of the boost signal, whereafter the stator coil current is caused to be driven in the other (e.g. negative) direction by the assertion of the buck signal. Note that the assertion of the buck signal does not take place until the stator coil current has fallen to zero. This means that in the driver circuit voltages are switched when currents are low and currents are switched when voltages are low, making the power dissipation in the switching devices quite small. As will be discussed in more detail with reference to the embodiment shown in FIGS. 5A, 5B and 6 this means that relatively lightweight switches (e.g. MOSFETs, instead of more expensive IGBTs) can be used as the switches in the circuit.

Figure 4:
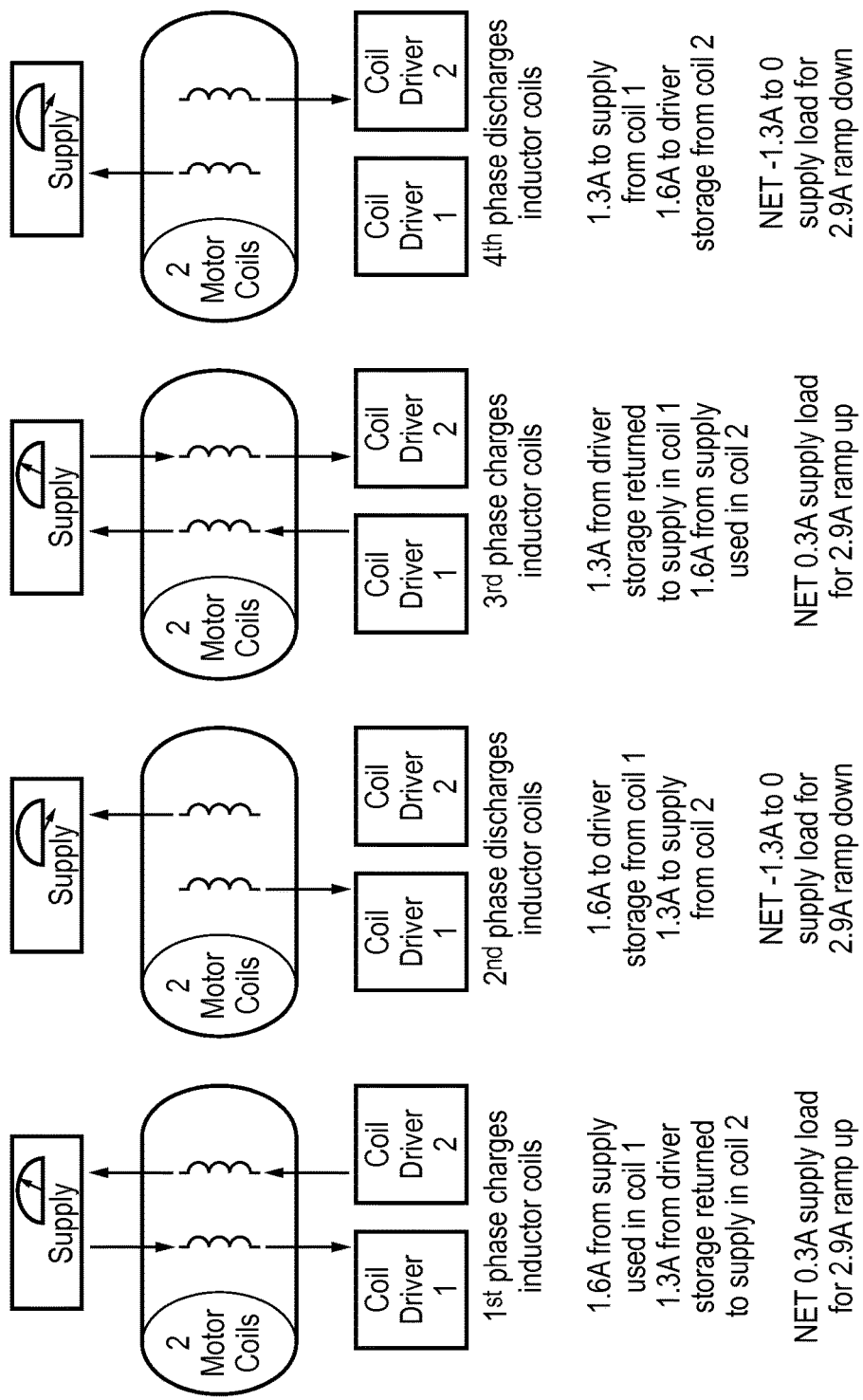
FIG. 4 shows the four phase operation of two coil driver circuits and the resulting current flows in one example embodiment.

A particular advantage of the present techniques with respect to driving electrical motor stator coils can be seen from FIG. 4, which illustrates a four phase process by which two stator coils are driven in one embodiment. Two stator coils are each coupled to a shared (DC) supply and to their own respective coil driver circuits.

In the first phase both motor coils are charged, but in opposite directions. The first motor coil is charged with current of a first polarity from the shared supply and the second motor coil is charged with current of a second (opposite) polarity from the storage capacitor of the second driver circuit. In the example given in the figure, 1.6 A from the supply is provided to the first coil, whilst 1.3 A deriving from the storage capacitor of the second driver circuit is returned to the supply via the second coil. As a result for a net 0.3 A supply load a sum coil ramp up corresponding to 2.9 A is achieved.

In the second phase both motor coils are discharged, again in opposite directions. The first motor coil is discharged into the storage capacitor of the first driver circuit and the second electrical motor coil is discharged to the shared supply. In the example given in the figure, 1.6 A is passed from the first coil to the storage capacitor of the first driver circuit, whilst 1.3 A is returned to the supply deriving from the second coil. As a result for a net supply load falling from −1.3 A to zero a sum coil ramp down of 2.9 A is achieved.

In the third phase both motor coils are charged again, but in the opposite direction to in the first phase. The first motor coil is charged with current of the second polarity from the storage capacitor of the first driver circuit and the second motor coil is charged with current of the first polarity from the shared supply. In the example given in the figure, 1.3 A deriving from the storage capacitor of the first driver circuit is returned to the supply via the first coil, whilst 1.6 A from the supply is provided to the second coil. As a result for a net 0.3 A supply load a sum coil ramp up corresponding to 2.9 A is achieved.

Finally in the fourth phase both motor coils are again discharged. The first motor coil is discharged to the shared supply and the second electrical motor coil is discharged into the storage capacitor of the second driver circuit. In the example given in the figure, 1.3 A is returned to the supply deriving from the first coil, whilst 1.6 A is passed from the second coil to the storage capacitor of the second driver circuit. As a result for a net supply load falling from −1.3 A to zero a sum coil ramp down of 2.9 A is achieved.

Figure 5A:
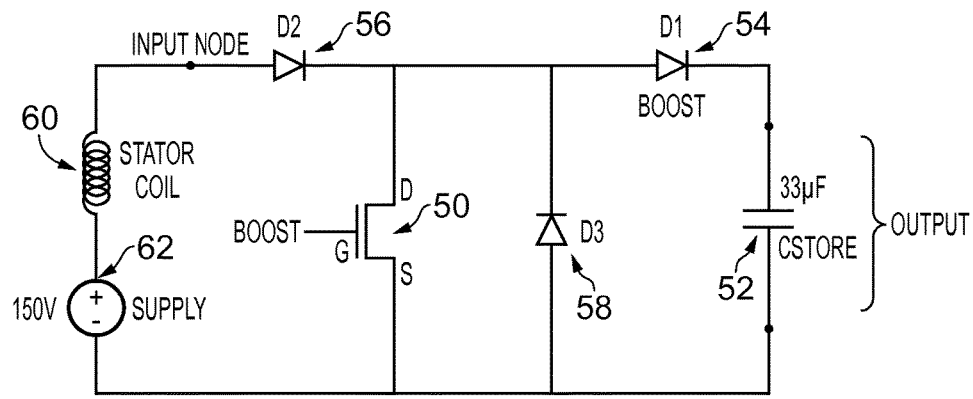
FIG. 5A schematically illustrates switched inductance boost voltage converter circuitry forming part of a driver circuit in one example embodiment.
Figure 5B:
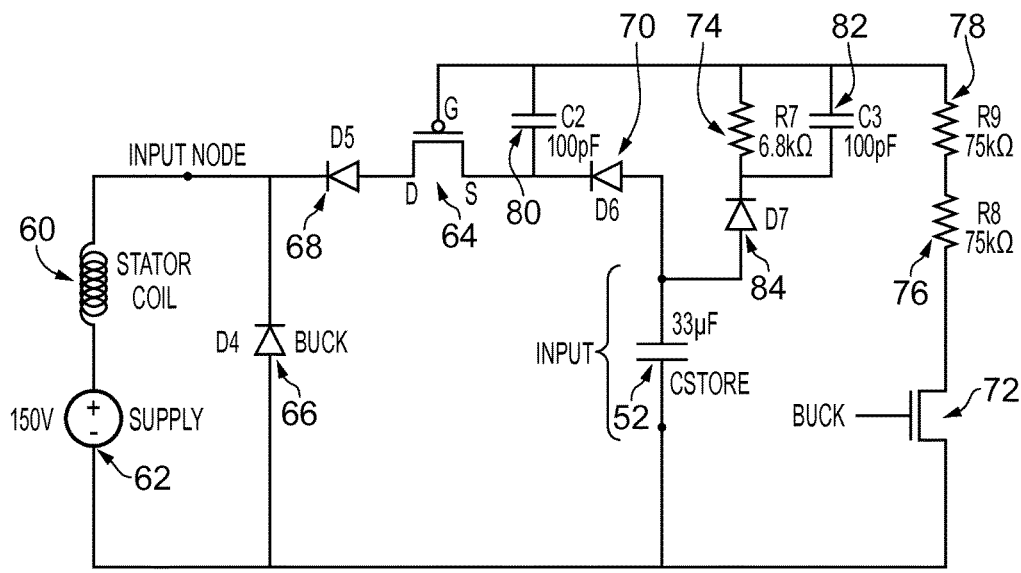
FIG. 5B schematically illustrates switched inductance buck voltage converter circuit forming part of a driver circuit in one example embodiment.
Figure 6:
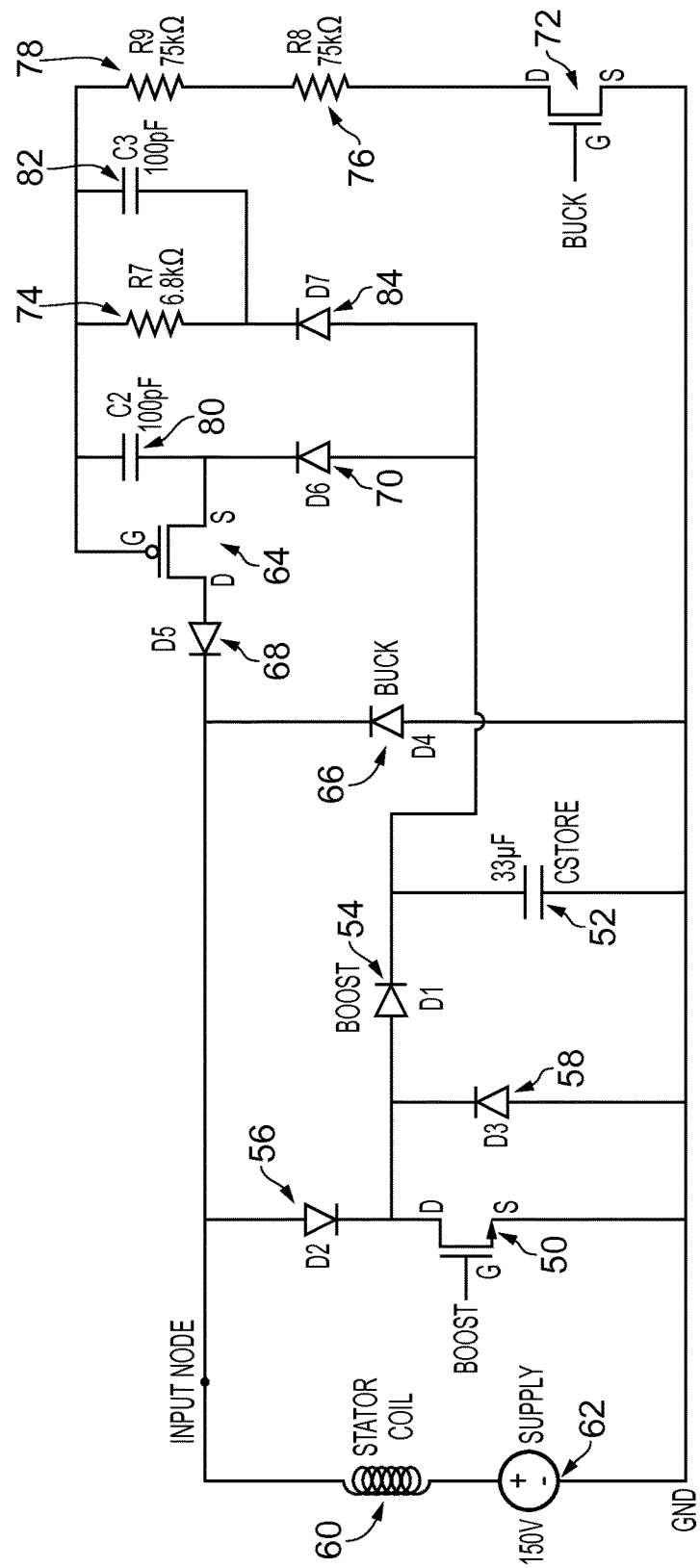
FIG. 6 schematically illustrates a driver circuit in one example embodiment.

More detail of the configuration of a driver circuit in one embodiment is now given with reference to FIGS. 5A, 5B and 6. The switched inductance boost voltage converter circuitry is represented separately in FIG. 5A, whilst the switched inductance buck voltage converter circuitry is represented separately in FIG. 5B, and the combined driver circuit having both switched inductance boost voltage converter circuitry and switched inductance buck voltage converter circuitry is shown in FIG. 6.

In the switched inductance boost voltage converter circuitry of FIG. 5A the boost switch is provided by the NMOS 50, whilst the storage capacitor (CSTORE) is provided by the 33 µF capacitor 52. Note that in addition to the boost diode (D1) 54, two further diodes D2 56 and D3 58 are also provided in this embodiment. The boost voltage converter circuitry is coupled to the stator coil 60 and the 150V DC supply 62.

With regard to the switched inductance buck voltage converter circuitry of FIG. 5B, it is important to note that the storage capacitor (CSTORE) is the same 33 µF capacitor 52 as shown in FIG. 5A. As labelled in FIGS. 5A and 5B, the voltage developed across the capacitor 52 can be viewed as the output of the switched inductance boost voltage converter circuitry of FIG. 5A and as the input of the switched inductance buck voltage converter circuitry of FIG. 5B. Also the buck voltage converter circuitry is coupled to the same stator coil 60 and the same 150V DC supply 62. In the embodiment shown in FIG. 5B the buck switch is provided by the PMOS 64. In addition to the buck diode 66 (D4), two further diodes 68 and 70 (D5 and D6) are also provided in this embodiment. Finally the switched inductance buck voltage converter circuitry of FIG. 5B also comprises reference circuitry coupled to the gate of the buck switch (PMOS 64). This reference circuitry is composed of NMOS 72, resistors 74, 76 and 78 (R7, R8 and R9), capacitors 80 and 82 (C2 and C3) and diode 84 (D7).

More detail of the configuration of the full driver circuit in this embodiment, showing its switched inductance boost voltage converter circuitry and its switched inductance buck voltage converter circuitry in their combined configuration is now given with reference to FIG. 6. The components of the driver circuit of FIG. 6 have the same reference numerals as the components shown in FIGS. 5A and 5B, since these latter separate representations are only shown separately to emphasise the respective part to which each component of the full driver circuit belongs.

The various additional diodes (i.e. in addition to the boost and buck diodes shown in FIG. 2) that are provided in this embodiment serve a number of purposes, but overall a particular role that they play is to enable the critical switching devices (boost switch 50 and buck switch 64) to be provided by very cheap MOSFET devices (instead of much more expensive IGBT devices, say), despite the size of motor coil and the supply voltage required for the motor (e.g. a 35 mH coil and a 150V DC supply). The large EMF and rapid voltage changes associated with operating a motor with this kind of configuration has the potential to cause damaging voltages and gate-step (turning them on when supposed to be off) so these diodes are used throughout the circuit to provide power blocking that protects the switches. The diodes also serve to separate the switched inductance boost voltage converter circuitry from the switched inductance buck voltage converter circuitry, such that the operation of one does not risk damage to the components of the other. For example the combination of the diodes 68 and 70 (D5 and D6) placed either side of PMOS 64 in the buck voltage converter circuitry prevents the power of the current flow discharging from the coil from turning this PMOS on and off during the "boost" mode of operation of the driver circuit (and thus adversely affecting correct operation of that boost mode and risking damage to this other components of the buck voltage converter circuitry).

Note that the transistor 64 is provided as a PMOS (as opposed to a cheaper NMOS) device, since when in the "buck" mode of operation and bucking through the inductance (coil) to the supply, the inductor (stator coil 60) pulls current through the buck diode 66, dropping the switch there to one diode drop below ground. This works when using a PMOS for transistor 64, since it just adds a little more drop on its drain. An NMOS device could in principle be used, but because of the above-mentioned pull down to below ground (which would be on the source of the NMOS device), additional circuitry would be required to provide its gate voltage at a below-ground level, since otherwise it could not be turned off when the inductor (stator coil 60) is discharging.

Additionally, the diodes in the circuit provide a rectifying function to rectify oscillations (ringing) that otherwise would strongly occur when driving a large capacitor from a large inductor.

The capacitors 80 and 82 (C2 and C3) are provided to suppress noise in the circuitry that could otherwise affect the stability of the switching of the gate of the buck switch (PMOS 64), the gate of this transistor being in particular susceptible to such noise by virtue of its connection to the storage capacitor 52 (albeit via the diodes 70 and 84 (D6 and D7). The capacitors 80 and 82 also form part of the reference circuitry, which notably further comprises the resistors 74, 76 and 78 (R7, R8 and R9) and the NMOS transistor 72. The provision of this reference circuitry enables the buck signal (BUCK) to be referenced to ground (GND) and the gate signal of the buck switch 64 to be referenced to the voltage present on the upper side (as illustrated in FIG. 6) of the storage capacitor 52. Hence, switching of the digital (low voltage) BUCK signal is able to correctly control the switching of the buck switch 64 by virtue of setting a correct source-drain threshold voltage (with respect to the voltage seen on the storage capacitor). Note that the parallel configuration of the diodes 70 and 84 (D6 and D7), the capacitors 80 and 82 (C2 and C3) and the resistors 74 and 76/78 (R7 and R8/R9) enable the circuitry to perform consistently across a range of voltage and temperature variation, due to the equivalent response that each these components in their respective pairs will have to that temperature and voltage variation. Note that logically the resistors 76 and 78 (R8 and R9) can be considered to form a single resistor, though are provided as two distinct components in this example embodiment for reasons of lower cost and size, as well as improved power dissipation. The provision of the diodes 70 and 84 (D6 and D7) also reduces the gate drop needed to be provided by the remainder of the reference circuitry, further reducing the cost of the resistive components that need to be explicitly provided (since they have lower power requirements) and allow a range of voltages to more easily be handled.

Figure 7:
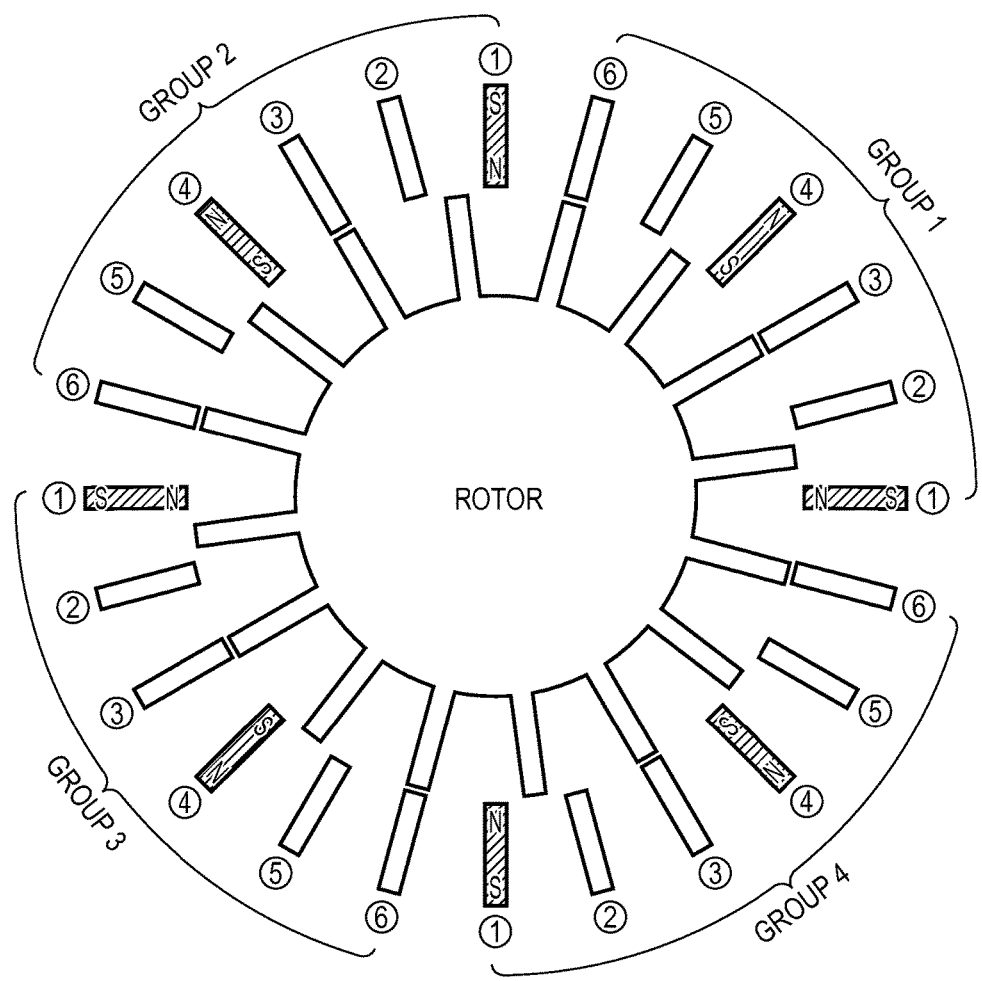
FIG. 7 shows an end view of a switched reluctance electrical motor in one example embodiment having 16 rotor teeth and 24 stator teeth.
Figure 12:
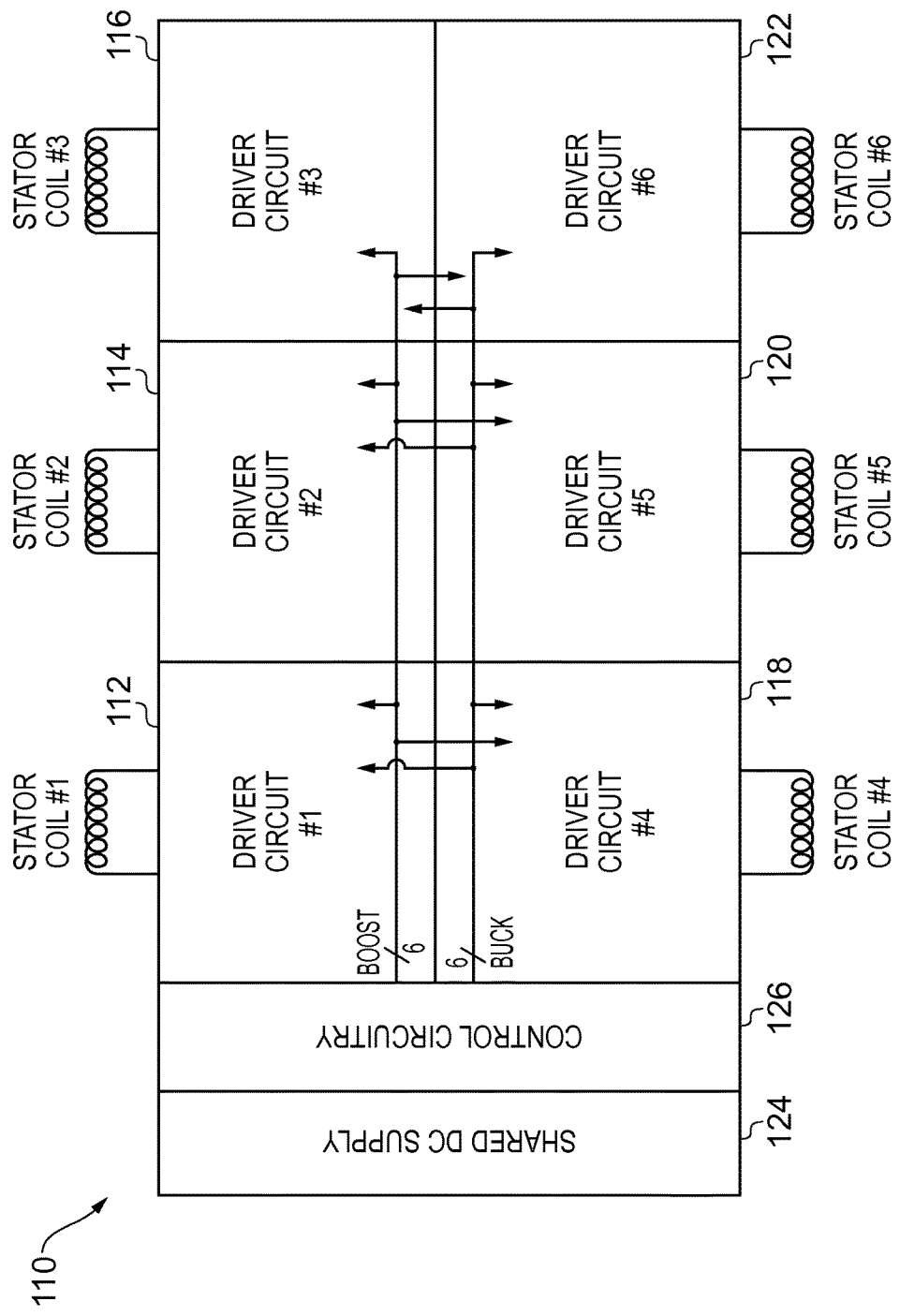
FIG. 12 schematically illustrates a driver board comprising 6 electrical motor coil driver circuits in one example embodiment.

FIG. 7 schematically illustrates a radial view of the rotor section and the teeth of one stator section in one example embodiment. In this embodiment control over the coils (not illustrated) of the stator section is arranged such that groups of 6 stator teeth have been put together and the cyclical control sequence asserted over each group runs through six stages, corresponding to the six stator teeth in that group. A further feature of this embodiment, to be discussed in more detail below with reference to FIG. 12, is that the driver circuits associated with each stator coil in a group are provided on one board which shares control circuitry and a single DC supply, so that the above-mentioned benefits of one driver circuit operating in "buck mode", whilst another driver circuit which shares the same supply is operating in "boost mode" can result. FIG. 7 further illustrates a snapshot of one stage of the six stage cycle in which a first stator coil in each group (labelled 1 in the figure) is currently being powered in a first direction (boost mode) in this embodiment, in which the resulting magnetic field induced in the stator tooth is oriented north (N) radially inwards and south (S) radially outwards, whilst the fourth stator coil in each group is simultaneously being oppositely powered (buck mode) in this embodiment, such that the magnetic field induced in the stator teeth is orientated south (S) radially inwards and north (N) radially outwards. Driving the stator coils of this electrical motor continues in this paired opposing induced magnetism fashion, wherein at the next stage stator teeth 2 and 5 are driven (oppositely with respect to one another), followed by stator teeth 3 and 6, followed by stator teeth 1 and 4 (in the opposite magnetic configuration to the first phase) and so on.

Still referring to FIG. 7, note that the configuration of the rotor and stator teeth (in particular the 2:3 ratio of their number) results in an arrangement in which when half of the rotor teeth are directly aligned with corresponding stator teeth, the other half of the rotor teeth are unaligned with the stator teeth (being aligned with the centre of the gap between two stator teeth in this embodiment). For an aligned pair of rotor/stator teeth this means that there is only a relatively small air gap (e.g. less than 0.5 mm) between the rotor tooth and the stator tooth, which corresponds to a low reluctance and hence no output power (zero torque) from the motor. Conversely the non-alignment of the other stator teeth of the set of six stator teeth with corresponding rotor teeth can thus provide a high reluctance and high torque configuration (due to the larger air gap, e.g. more than 1.0 mm) between the non-aligned stator/rotor teeth). Whilst in known switched reluctance electric motors partial overlap between the rotor and stator teeth may be required in order to keep the motor in a configuration where reluctance is low for an acceptable efficiency, but torque can still be achieved—although at a level below the maximum possible, the present electrical motor system achieves an improved trade-off between torque and efficiency by providing a configuration in which higher torque can be generated (by the non-aligned stator/rotor teeth), but also in which energy that is expended in generating a magnetic field which doesn't get used gets recycled, thus improving the efficiency.

Figure 8:
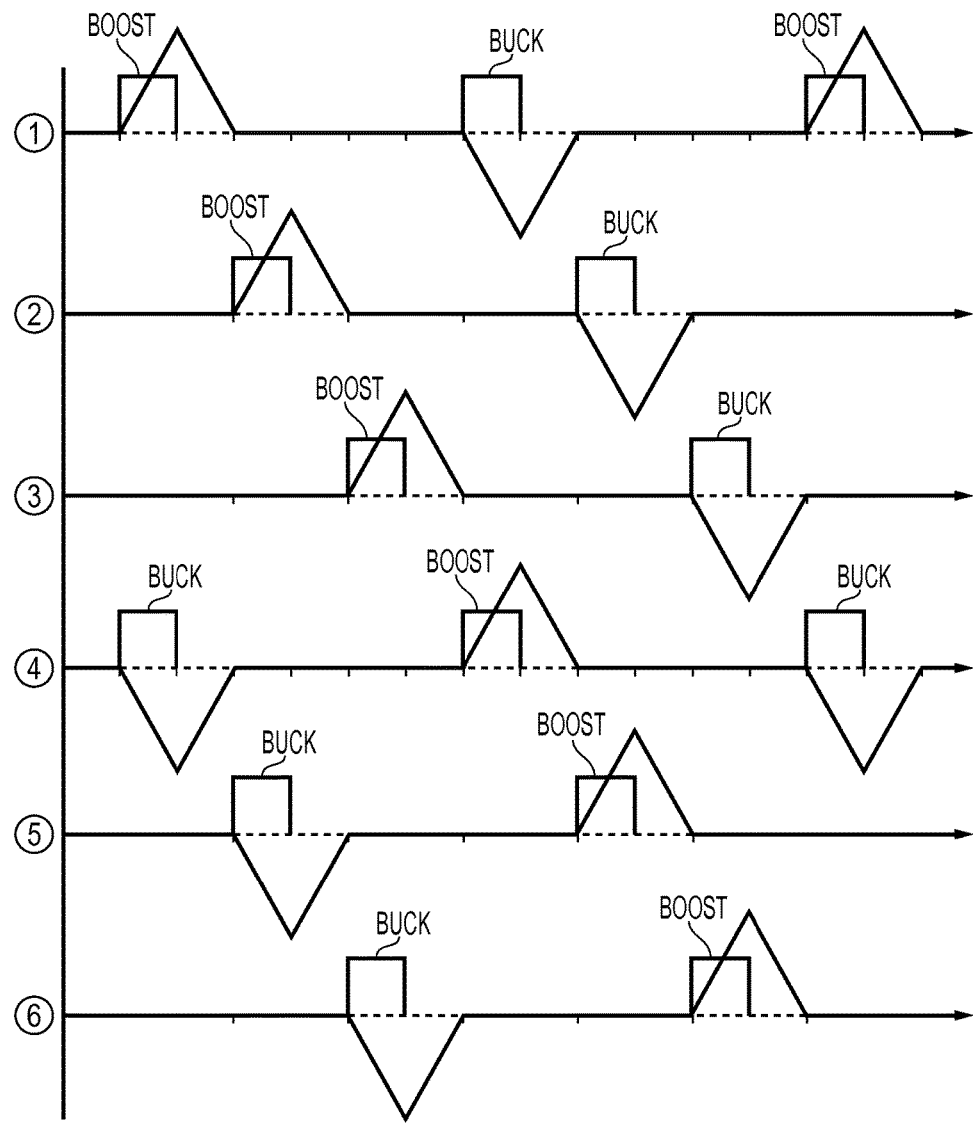
FIG. 8 illustrates a six stage control operation for a group of 6 stator coils in one example embodiment.

FIG. 8 schematically illustrates the relative timing of the boost and buck signals in the driver circuits which provide the above-described control over the set of six stator teeth in each group. The above mentioned pairing over the control over stator coils 1/4, 2/5 and 3/6 can be seen, in which the stator coil of each pair is always driven by a driver circuit in opposite mode (boost/buck) and the resulting current flow (triangular wave forms in the figure) is always of opposite plurality. Note that the start of the assertion of the boost and buck signals only begins when the current in the respective circuit is zero (or at least negligible) to ensure that the components of the respective driver circuits are not damaged by any residual opposing current flow. The sequence of control signals shown in FIG. 8 is applied to each of the four groups of stator coils shown in FIG. 7 when the electrical motor is configured to be in a full power configuration, however it is also possible for the electrical motor to operate in a lower power configuration when at least one of the groups of stator coils is not powered. This may be achieved by varying the boost and buck control signals asserted, which may in turn be achieved by switching off one or more driver circuits or one or more driver boards as appropriate. Additionally, it should be noted that the speed at which the motor operates is thus determined by the timing sequence of boost and buck signals applied (such as in FIG. 8) and not on the particular power level at which the motor is operating. The power level may be determined by the size of the current pulses which result from the chosen boost and buck signal durations. Hence, for example, for approximately similar power levels, the motor may be operated at two significantly different speeds (e.g. 500 rpm and 1000 rpm). This independence of the rotational speed from the operational power level adds significant flexibility to the user's choice of how to operate the motor, dictating the rotational speed by means of the timing sequence and the overall operational power level by the choice of which groups of stator coils to power. Moreover the fact that the user has such direct and independent control over the rotational speed of the motor means that in many circumstances the transmission or gearing provided in association with a traditional electric motor can be dispensed with.

Figure 9:
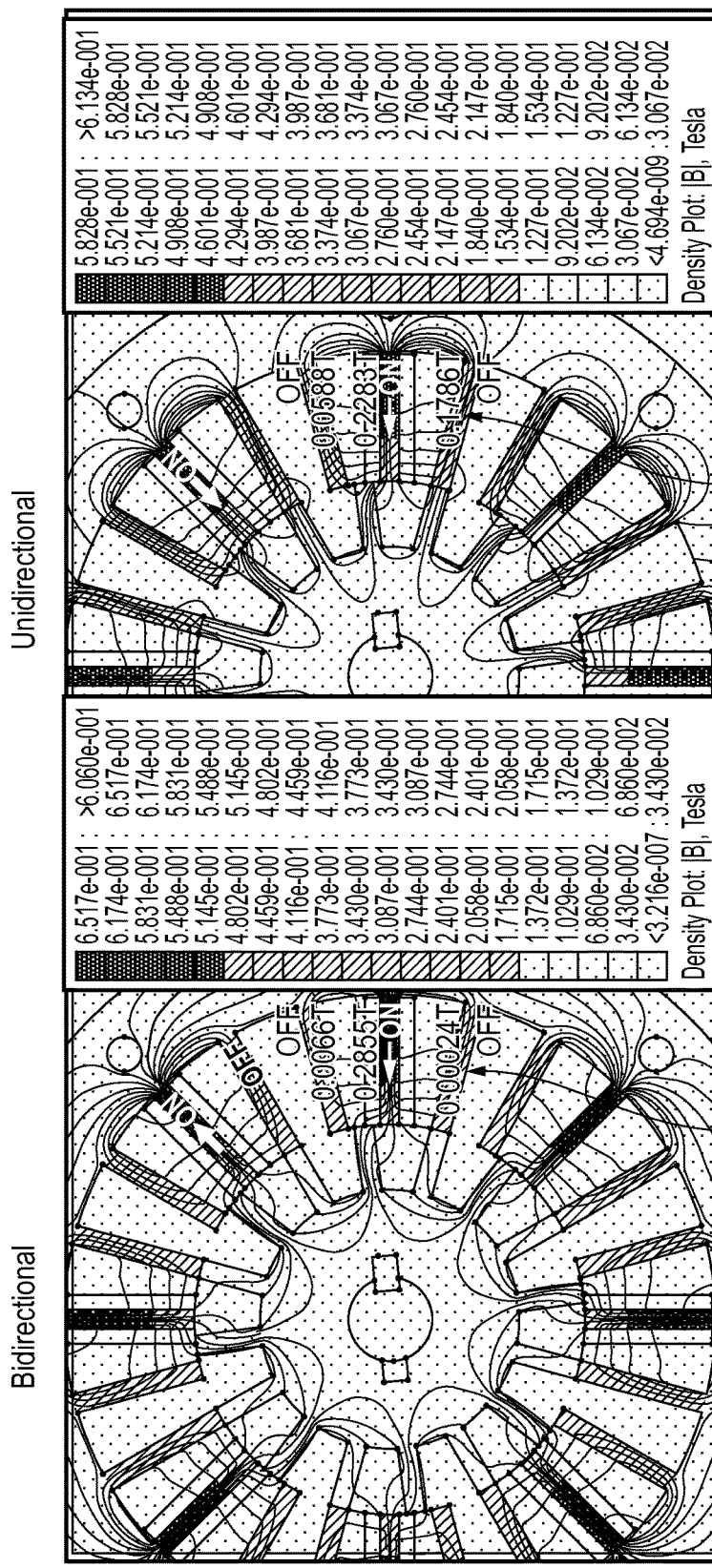
FIG. 9 shows a simulation of the magnetic field density for a switched reluctance motor powered by a bidirectional coil driver circuit of one example embodiment compared to configuration which only provides unidirectional current.

FIG. 9 shows a simulation of the magnetic fields which develop in one operational state of an example electrical motor when viewed in the same radial presentation as that of FIG. 7. This (shown on the left hand side) is labelled "bidirectional" and corresponds to driver circuits according to the present techniques being used to simultaneously drive pairs of stator coils in a group in opposite directions. For comparison a second simulation (shown on the right hand side) is labelled "unidirectional" and corresponds to a configuration in which instead pairs of stator coils in a group are simultaneously driven in the same direction. The magnetic field notations (in Tesla) are what occur in the air gaps between the stator teeth. When measured in the air gap, it can be seen that (for the bidirectional case by comparison with the unidirectional case) the resulting ON field is about 25% greater, the top OFF field is about 9 times smaller and the bottom OFF field is nearly 750 times smaller. The increased ON field increases torque and the decreased OFF fields reduce drag. This is due to the fact that the bidirectional configuration creates reinforcing magnetic fields in the electrical motor—and in particular in the rotor section—which further enhance the efficiency of this motor system.

Figures 10A, 10B:
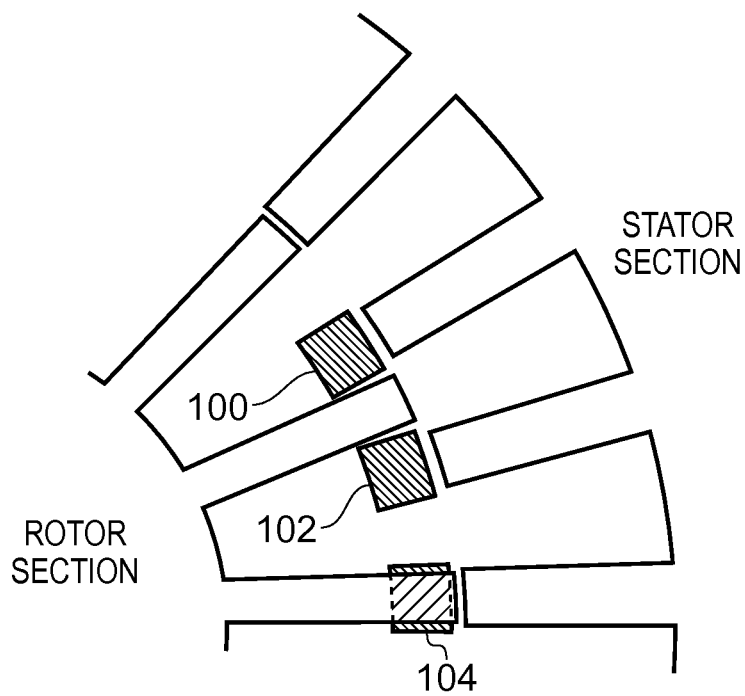
FIG. 10A schematically illustrates the placement of 3 optical sensors to provide rotational position information for the rotor with respect to the stator in an electrical motor in one example embodiment.
FIG. 10B shows the set of six possible optical sensor outputs for the three optical sensors shown in FIG. 10A.

FIGS. 10A and 10B illustrate the use of optical sensors to provide relative position information for the rotor section with respect to the stator section(s). FIG. 10A shows three optical sensors 100, 102, 104 positioned aligned with three of the stator teeth, and sized and calibrated such that a) when a rotor tooth is aligned with an optical sensor and stator tooth, only one optical sensor registers the presence of a rotor tooth and b) as the rotor rotates with respect to the stator section, at most two of the optical sensors register the presence of rotor teeth. This configuration means that with only three optical sensors (ultimately resulting in three bits of information—possibly after analogue to digital conversion, depending on the type of sensor used) the relative orientation of the rotor to the stator can be determined to within 2.5° (for this 16 rotor teeth/24 stator teeth example configuration). Moreover there are no intermediate positions in which no information about the relative rotor-stator position is available and as such whatever position the motor stops in it can always be known which stator coils to activate to get the motor running. FIG. 10B shows the corresponding three optical sensor outputs as the rotor rotates with respect to the stator.

Figure 11A:
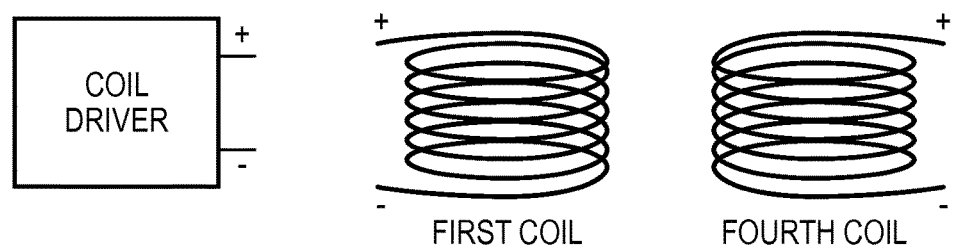
FIGS. 11A and 11B schematically illustrate two examples of how the magnetic field polarity in a motor coil may be inverted in two example embodiments.
Figure 11B:
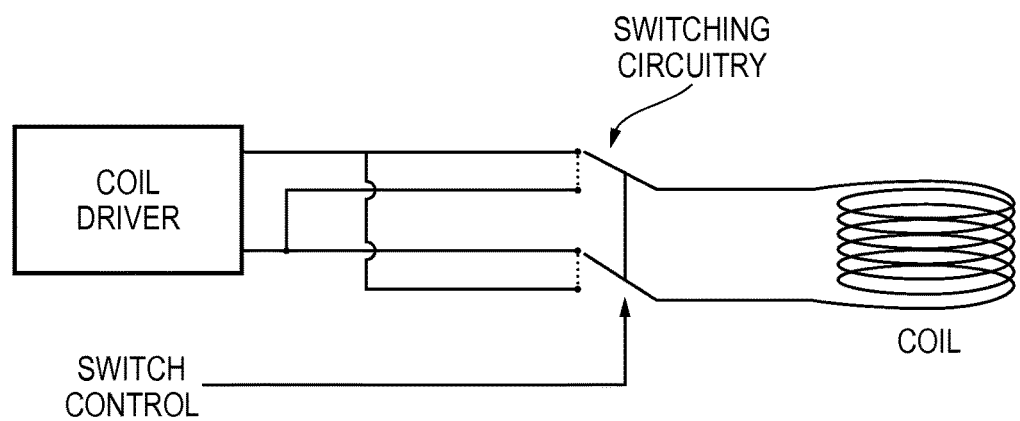

In some example configurations the direction of the electrical power through a stator coil—and hence the direction of the resulting magnetic field—may be brought about by a particular configuration of the connections to the coil. FIG. 11A shows one example configuration in which a coil driver circuit can be used to provide the power to both of a pair of stator coils which are active at a time, but activated in opposite directions (in the figure this being the first and fourth coil in a group of six). The winding of the first and the fourth coils has been made in the opposite sense to each other, so that for one polarity of electrical power provided by the coil driver, oppositely oriented magnetic fields in the first and fourth stator teeth results. FIG. 11B shows another example configuration in which additional switching circuitry is provided in association with each stator coil, controlled by a switch control signal which determines the direction of current flow through the coil. The switch control signal could either be provided by the coil driver or for example by the control circuitry which controls the coil driver.

FIG. 12 schematically illustrates a driver board in one example embodiment. This driver board is provided as a single integrated circuit board on which six driver circuits 112, 114, 116, 118, 120 and 112 (for example configured as shown by FIG. 6), control circuitry 126 and shared DC supply 124 are arranged. The control circuitry provides the boost and buck control signals individually to each of the driver circuits. The provision of the shared DC supply on the same board as the six driver circuits means that the above-described (for example with respect to FIG. 4) majority movement of current within the board (as opposed to on and off the board) is supported.

Figure 13:
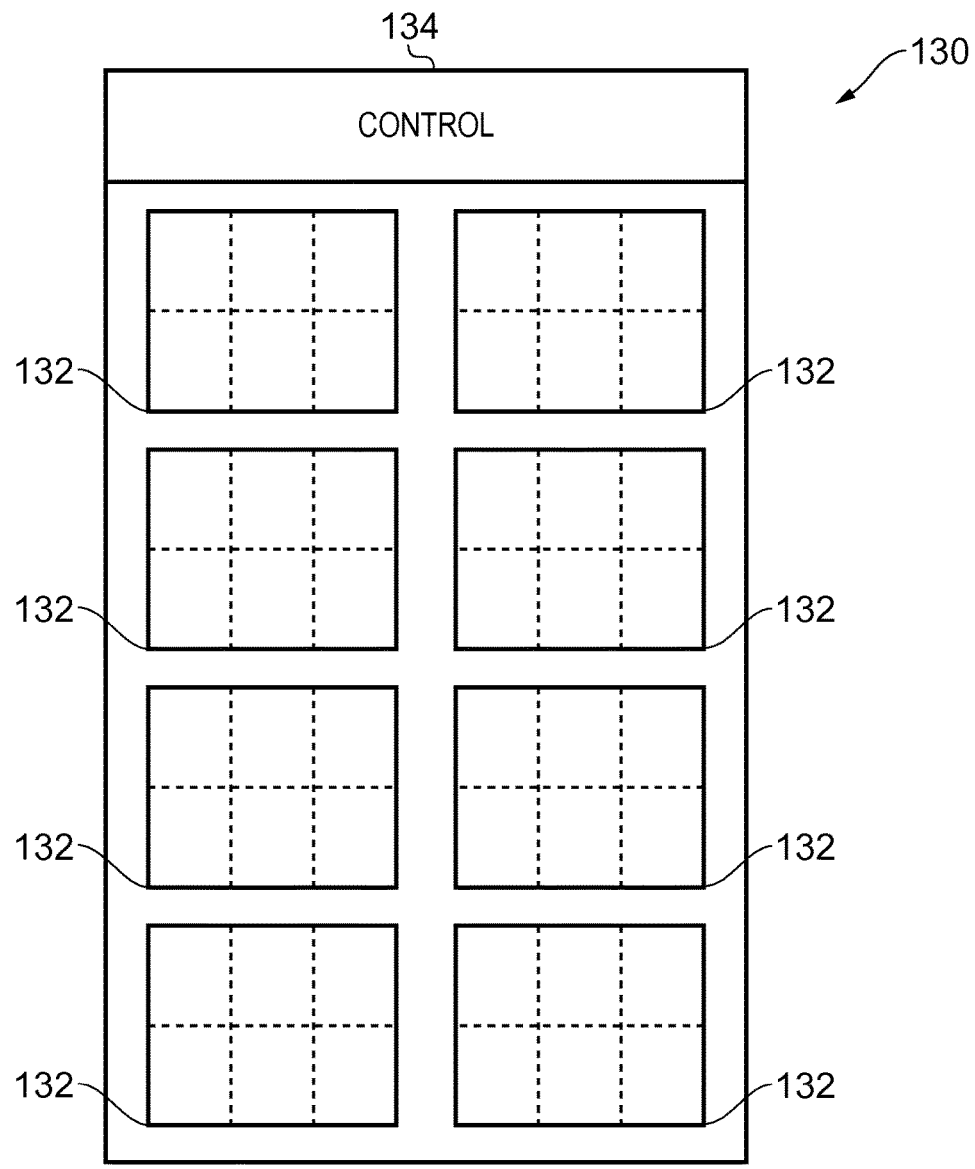
FIG. 13 schematically illustrates a switched reluctance electrical motor driver apparatus comprising eight driver boards as shown in FIG. 12 in one example embodiment.

FIG. 13 schematically illustrates a complete switched reluctance electrical motor driver apparatus 130 in one example embodiment which comprises eight driver boards 132 (for example configured as shown by FIG. 12) and is hence configured to control 48 individual stator teeth (as are present in the example motor system shown in FIG. 1). An overall control unit 134 also forms part of the apparatus 130 and dictates the high-level operation of the eight driver boards 132, for example causing individual driver boards to be temporarily switched off when the electrical motor should operate in a lower power mode and when each individual driver board is coupled to a set of stator coils (for example a quadrant in each stator section) which can be switched off to effect this low power mode. It is important to appreciate however that the combination of driver circuit control provided by the overall control 134 and the board controls 126 are such that firstly any individual driver circuit can be switched on or off regardless of the operation of the other driver circuits and secondly the control over each stator coil provided by each driver circuit is fully independent of the control over any other stator coil provided by any other driver circuit. As such therefore, the electrical motor driver apparatus 130 thus provides individual control over up to 48 driver circuits and hence stator coils, although in the light of the above discussion about groups of stator coils and pairs of driver circuits it may be chosen to closely link the operation of some driver circuits due to the benefits which result, and in such a configuration the phases of electrical power provided to various stator coils may be the same.

Figure 14:
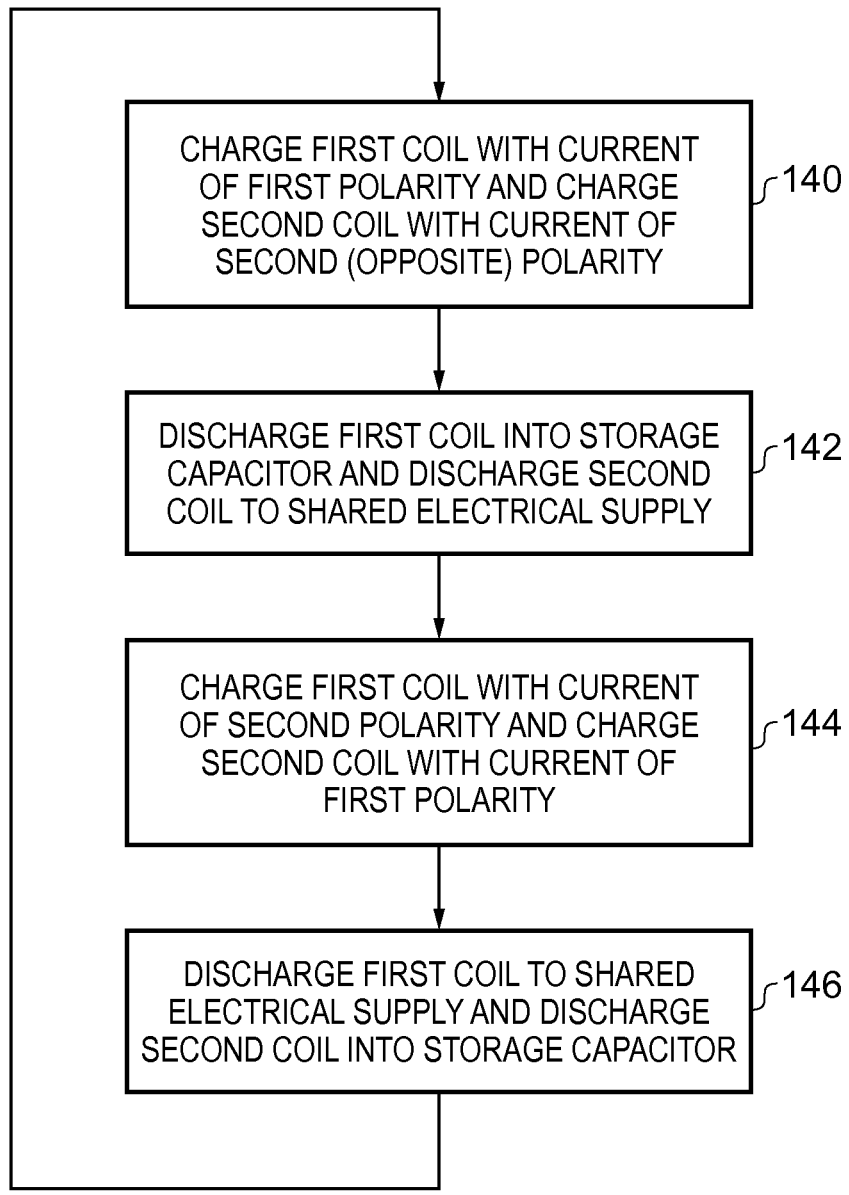
FIG. 14 schematically illustrates a sequence of steps which are taken in the method of one example embodiment.

FIG. 14 shows a sequence of steps which are taken in one example embodiment, illustrating how two driver circuits are operated. The flow can be considered to commence at step 140 where in a first phase a first stator coil of a switched reluctance electrical motor is charged by one driver circuit with current of a first polarity from a shared supply and a second stator coil is charged with current of a second (opposite) polarity from the storage capacitor of the second driver circuit. At step 142, in a second phase, both motor coils are discharged, the first stator coil being discharged into the storage capacitor of the first driver circuit and the second electrical motor coil is discharged to the shared supply. At step 144, in a third phase, both motor coils are charged again, but each in the opposite direction to the first phase. The first motor coil is charged with current of the second polarity from the storage capacitor of the first driver circuit and the second motor coil is charged with current of the first polarity from the shared supply. Finally at step 146, in a fourth phase, both motor coils are again discharged. The first motor coil is discharged to the shared supply and the second electrical motor coil is discharged into the storage capacitor of the second driver circuit.

Figure 15:
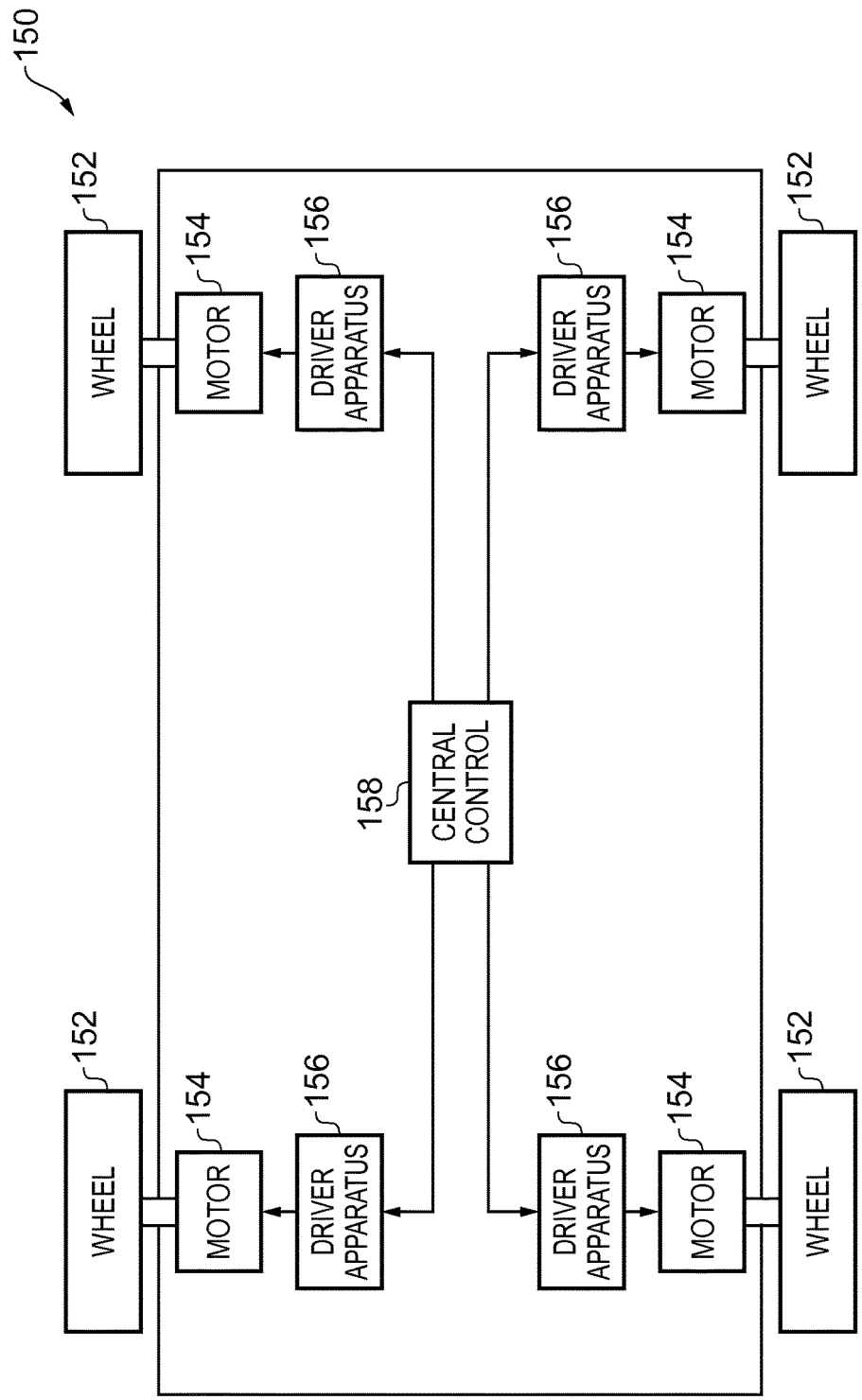
FIG. 15 schematically illustrates the motor system of one example embodiment used to power the wheels of a car.

FIG. 15 schematically illustrates an electric vehicle, say an automobile, in which an example embodiment of the electrical motor system is to be found. The vehicle 150 has four wheels 152, each driven by its own motor 154. Each motor 154 is driven by an associated driver apparatus 156, and overall control of the set of four driver apparatuses is maintained by a central control unit 158. Within each motor 154 the coil windings provided on each stator tooth are aluminium. In the context of a mobile vehicle, this is beneficial because aluminium is approximately three times lighter than copper and approximately five times cheaper (by weight), making it approximately fifteen times cheaper per area (making it cheap enough to be a replaceable wear item). In other embodiments the coil windings provided on each stator tooth may be copper, or any other suitably conductive metal.

Previously the choice of aluminium for the stator coil windings would have generally been rejected however, because aluminium's resistance is twice as high per cross sectional area, and because it fatigues with vibration more quickly than copper. However in an electrical motor system according to the present techniques, the current required in the coils is notably low and hence the power loss (according to $I^2R$) due to the higher resistance is of lesser significance. Indeed the higher value of R in fact makes the L/R time constant lower, and so the driver circuit operates faster.

Furthermore, the combination of the low cost of the motor and its flexibility of operation with respect to rotational speed means that it is practical in the example embodiment shown in FIG. 15 to provide an individual motor at each wheel, rather than one central motor with associated gearing and transmission. Placing such a "cheap" motor, using aluminium windings for the stator coils, at each wheel makes the motor accessible to be a replaceable item (in the manner of a brake pad, say) and the benefit of using the cheap aluminium can be realized.

It should be appreciated that such an arrangement is also possible, at least in part, due to the lessened importance of the magnetic energy transfer to the rotor from the coil here. This is due the fact that the present techniques mean that whatever magnetically stored energy that doesn't get magnetically transferred to the rotor from the coil can be recovered and reused. Where previously the air-gap between the coils and the rotor in the motor would have to be very small—e.g. a fraction of a millimeter—in order to maintain an acceptable efficiency (by good magnetic energy transfer from the rotor to the coil), this constraint on the size of the air-gap is more relaxed for the present motor system, due to the recycling of energy. In turn this means that the motor can be positioned in a much more exposed position, due to its greater tolerance for a more relaxed (and varying) air-gap.

Figure 16:
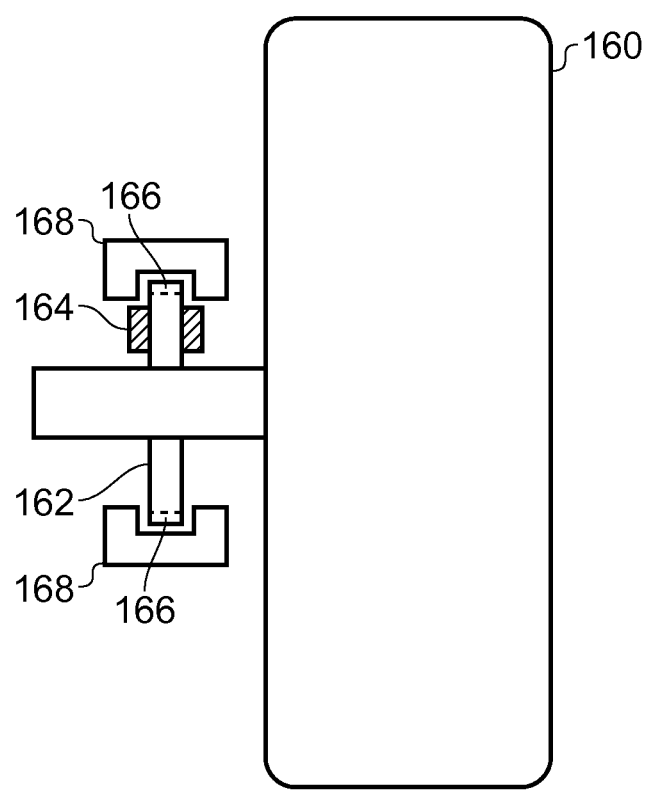
FIG. 16 schematically illustrates an example embodiment in which a motor system is provided by the adaptation of a brake disk in an automobile.

Indeed FIG. 16 illustrates an example motor embodiment in which an automobile wheel 160 has a brake disk 162 which has been adapted to form part of the motor. Brake pads 164 continue to perform the usual braking function through selective frictional application to the brake disk 162, but the outer edge 166 of the brake disk 162 has been adapted to provide the rotor portion (e.g. with molded fins or spokes to provide variable reluctance) of the motor. A surrounding part 168 provides the stator portion. Combining an "existing" component with the motor in this manner also has clear weight reduction advantages for the vehicle as a whole. Such an adaptation could also for example be made to other components of the general wheel assembly such as the steel rim or the brake drum. Previous switched reluctance motor designs would typically be unable to tolerate operation in this kind of exposed position, due to their fine sensitivity as regards the air-gap between the coils and the rotor in the motor, for example requiring the air-gap to be less than 0.5 mm, and the exposure of a relatively expensive motor in this manner would not normally be contemplated. However the present techniques: a) provide a considerably cheaper motor system which makes its own replacement a less significant cost factor; b) allow a lower current configuration which makes its construction out of cheaper, but more resistive materials (such as aluminium) more practical; and c) recycle the energy used, thus allowing an improved efficiency and making a precise and small coil to rotor air-gap less significant, e.g. allowing the air-gap to be greater than 1.0 mm.

In conclusion, it will be appreciated from the above description that the electrical motor system and its associated coil driver circuitry described herein enables the use of strong magnetic fields in the stator coils at low net power outputs by recycling the unused energy that isn't translated into rotational energy from those fields. With this capability and further by means of being able to disable groups of the stator coils the motor can be operated efficiently down to extremely low input levels. For example, a prototype 750 W (1HP) motor constructed according to the described principles has been operated across its full range of output speeds with input power levels as low as 15 W, i.e. 50× lower than its design power. This capability, in addition to operating the motor at low rotational speeds (facilitated by the large number of phases and rotor teeth) allows the motor to operate efficiently at a wide variety of output levels, which may obviate the need for a gearbox and/or transmission in various systems.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. An electrical motor system comprising:
   a switched reluctance electrical motor comprising a rotor section and a stator section, the rotor section comprising a plurality of rotor teeth and the stator section comprising a plurality of stator teeth, the stator teeth wound with respective coils, and
   coil driver circuitry coupled to the coils of the stator teeth and comprising boost circuitry and buck circuitry to independently control a phase and direction of electrical power to each coil of the plurality of stator teeth,
   wherein the coils of the stator teeth each have an inductance which absorbs electrical energy provided to that coil by the coil driver circuitry and subsequently releases at least a portion of the electrical energy back to the coil driver circuitry when that coil is not being actively driven by the coil driver circuitry,
   and wherein the coil driver circuitry comprises an electrical energy store to store the portion of the electrical energy released back from the inductance of each coil and the electrical energy provided to each coil of the stator teeth by the coil driver circuitry is augmented by the electrical energy stored in the electrical energy store.

2. The electrical motor system as claimed in claim 1, wherein the coil driver circuitry comprises a plurality of independently powerable coil drivers, each coil driver coupled to the coils of a subset of the plurality of stator teeth.

3. The electrical motor system as claimed in claim 2, wherein each coil driver is coupled to the coils of at least 6 stator teeth.

4. The electrical motor system as claimed in claim 1, wherein the plurality of rotor teeth and the plurality of stator teeth are in a two:three ratio.

5. The electrical motor system as claimed in claim 1, wherein the stator section comprises at least 12 stator teeth.

6. The electrical motor system as claimed in claim 5, wherein the at least 12 stator teeth are grouped into sets of six stator teeth, wherein the coils of a set of six stator teeth are configured to be driven such that when a first coil of the set is provided with electrical energy, a second and third coil of the set are not substantially provided with electrical energy, a fourth coil of the set is provided with electrical energy, and a fifth and sixth coil of the set are not substantially provided with electrical energy,
  wherein the first to sixth coils of the set are arranged in adjacent, numerically increasing order, and the switched reluctance electrical motor is configured so that the magnetic fields developed in the first and fourth coil of the set are of opposite polarity.

7. The electrical motor system as claimed in claim 6, wherein the coils of the set of six stator teeth are configured to be driven in a repeating sequence in which:
  firstly the first and fourth coils of the set are provided with electrical energy and the second, third, fifth and sixth coils of the set are not substantially provided with electrical energy;
  secondly the second and fifth coils of the set are provided with electrical energy and the first, third, fourth and sixth coils of the set are not substantially provided with electrical energy; and
  thirdly the third and sixth coils of the set are provided with electrical energy and the first, second, fourth and fifth coils of the set are not substantially provided with electrical energy.

8. The electrical motor system as claimed in claim 6, wherein the coil driver circuitry is configured to bring about the opposite polarity of the electrical energy provided to the fourth coil of the set by actively driving the fourth coil of the set with the opposite polarity with which it actively drives the first coil of the set.

9. The electrical motor system as claimed in claim 6, wherein the fourth coil of the set is wound in an opposite sense to the first coil of the set to bring about the opposite polarity of the electrical energy provided to the fourth coil of the set.

10. The electrical motor system as claimed in claim 6, wherein the switched reluctance electrical motor further comprises a switching arrangement configured to bring about the opposite polarity of the electrical energy provided to the fourth coil of the set.

11. The electrical motor system as claimed in claim 1, wherein the switched reluctance electrical motor further comprises three optical sensors positioned relative to three stator teeth of a set of six stator teeth to detect positions of rotor teeth.

12. The electrical motor system as claimed in claim 11, wherein the three optical sensors are arranged such that there is always an output from either one or two of the three optical sensors indicating at least partial alignment of either one or two rotor teeth with the one or two optical sensors, and such that there is never output from all three of the optical sensors indicating at least partial alignment of three rotor teeth with the three optical sensors.

13. The electrical motor system as claimed in claim 6, wherein the rotor teeth are arranged such that when a first rotor tooth is closest to a stator tooth wound with the first coil of the set, further rotor teeth in positions adjacent-plus-one to the first rotor tooth provide the predominant return path for a magnetic field induced in the first rotor tooth.

14. The electrical motor system as claimed in claim 6, wherein the rotor teeth and the stator teeth are arranged with respect to one another in a configuration in which, for any given relative orientation of the rotor section and the stator section, a maximum of two of the set of six stator teeth are substantially aligned with corresponding rotor teeth, and wherein when the maximum of two of the set of six stator teeth are substantially aligned with corresponding rotor teeth no other stator teeth of the set of six stator teeth have at least partial alignment with corresponding rotor teeth.

15. The electrical motor system as claimed in claim 1, wherein the coil driver circuitry is configured selectively to disable electrical energy supply to at least one selected set of six stator teeth coils.

16. The electrical motor system as claimed in claim 15, wherein the coil driver circuitry is configured selectively to disable electrical energy supply to pairs of selected sets of six stator teeth coils.

17. The electrical motor system as claimed in claim 1, wherein the coil of each stator tooth is wound with at least 100 turns.

18. The electrical motor system as claimed in claim 1, wherein a current supplied to the coil of each stator tooth is less than 10 A.

19. The electrical motor system as claimed in claim 1, wherein the switched reluctance electrical motor comprises two stator sections, wherein the two stator sections are arranged adjacent to one another along a longitudinal axis of the switched reluctance electrical motor.

20. A method of operating an electrical motor system which comprises a switched reluctance electrical motor comprising a rotor section and a stator section, the rotor section comprising a plurality of rotor teeth and the stator section comprising a plurality of stator teeth, each stator tooth wound with a respective coil, and coil driver circuitry comprising boost circuitry and buck circuitry, the method comprising the steps of:
  controlling an independent phase and direction of electrical power to each coil of the plurality of stator teeth using boost and buck operations of the boost and buck circuitry;
  absorbing, in an inductance of each of the coils of the stator teeth, electrical energy provided to that coil;
  releasing, from the inductance of each of the coils of the stator teeth, at least a portion of the electrical energy when that coil is not being actively driven;
  storing the portion of the electrical energy released back from the inductance of each coil; and
  augmenting the electrical energy provided to each coil of the stator teeth by the electrical energy stored.

21. An automobile wheel assembly in which a component of the wheel assembly is adapted to form the rotor section of the switched reluctance electrical motor in the electrical motor system as claimed in claim 1.

22. The automobile wheel assembly as claimed in claim 21, wherein the component of the wheel assembly is at least one of: a brake disk, a brake drum and a wheel rim.

23. An electrical motor system comprising:
  a switched reluctance electrical motor comprising a rotor section and a stator section, the rotor section comprising a plurality of rotor teeth and the stator section comprising a plurality of stator teeth wound with a respective coil; and
  coil driver circuitry coupled to the coils of the stator teeth and comprising boost circuitry and buck circuitry to independently control a phase and direction of electrical power provided to each coil,
  wherein the coil driver circuitry comprises an electrical energy store to store a portion of the electrical energy released back from an inductance of each coil and wherein the coil driver circuitry is arranged to augment the phase of electrical energy provided to each coil with energy from the electrical power store.

* * * * *